(12) United States Patent
Xia et al.

(10) Patent No.: US 11,772,371 B2
(45) Date of Patent: Oct. 3, 2023

(54) HIGH-PERFORMANCE MULTILAYER FILM FOR PACKAGING

(71) Applicant: JIAPU INNOVATIVE FILM (KUNSHAN) CO., LTD., Jiangsu (CN)

(72) Inventors: Jialiang Xia, Suzhou (CN); Xuewen Gao, Suzhou (CN); Yu Xia, Suzhou (CN); Minyan Tang, Suzhou (CN)

(73) Assignee: JIAPU INNOVATIVE FILM (KUNSHAN) CO., LTD., Suzhou (CN)

( * ) Notice: Subject to any disclaimer, the term of this patent is extended or adjusted under 35 U.S.C. 154(b) by 0 days.

(21) Appl. No.: 17/856,540

(22) Filed: Jul. 1, 2022

(65) Prior Publication Data

US 2022/0332097 A1 Oct. 20, 2022

Related U.S. Application Data

(63) Continuation of application No. 16/609,672, filed as application No. PCT/CN2018/079202 on Mar. 15, 2018, now abandoned.

(30) Foreign Application Priority Data

Mar. 15, 2017 (CN) .......................... 201710154476.4

(51) Int. Cl.
| | | |
|---|---|---|
| *B32B 27/08* | (2006.01) | |
| *B32B 7/12* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B65D 65/40* | (2006.01) | |

(52) U.S. Cl.
CPC ................ *B32B 27/08* (2013.01); *B32B 7/12* (2013.01); *B32B 27/306* (2013.01); *B32B 27/32* (2013.01); *B32B 27/34* (2013.01); *B32B 27/36* (2013.01); *B65D 65/40* (2013.01); *B32B 2250/05* (2013.01); *B32B 2250/24* (2013.01); *B32B 2307/518* (2013.01); *B32B 2307/72* (2013.01); *B32B 2439/70* (2013.01); *B32B 2553/00* (2013.01)

(58) Field of Classification Search
CPC .......... B32B 2250/24; B32B 2307/518; B32B 27/08; B32B 27/306; B32B 27/32; B32B 27/34; B32B 27/36; B32B 7/12; B32B 27/30; B32B 2250/05; B32B 2307/72
See application file for complete search history.

(56) References Cited

U.S. PATENT DOCUMENTS

2013/0164512 A1* 6/2013 Yoo ........................ B32B 27/38
428/212

FOREIGN PATENT DOCUMENTS

| CN | 102029754 A | * | 4/2011 |
| CN | 102029754 A | | 4/2011 |

\* cited by examiner

*Primary Examiner* — Alicia J Weydemeyer
(74) *Attorney, Agent, or Firm* — Oliff PLC

(57) ABSTRACT

A high-performance multilayer film for packaging, the structure being: BL/TIE/PO1/POX/PO3, obtained once by multilayer coextrusion and biaxial stretching, wherein: the total thickness of the multilayer film is 8 to 100 micrometers; the absolute value of the difference of the solubility parameters between the PO1 and PO3 layer materials is ≥0.1 and ≤0.5, and the absolute value of the difference of the cohesive energy density is ≥3, and ≤5; the solubility parameter and cohesive energy density of the POX bridge material are based on one of the PO1 and PO3 layer materials, and it's transitioned to the other in a gradient way; the absolute value of the difference of the solubility parameters between adjacent layers from the PO1 layer to the POX bridge and the PO3 layer is ≤0.1 $(J \cdot cm^{-3})^{1/2}$, and the absolute value of the difference of the cohesive energy density is ≤3 $J/cm^3$).

5 Claims, No Drawings

HIGH-PERFORMANCE MULTILAYER FILM FOR PACKAGING

CROSS-REFERENCE TO RELATED APPLICATIONS

The present application is a Continuation of U.S. application Ser. No. 16/609,672 filed Oct. 30, 2019, which in turn is a U.S. National Stage Application of PCT/CN2018/079202 filed Mar. 15, 2018, and claims priority to Chinese Patent Application No. 201710154476.4 filed Mar. 15, 2017. The disclosure of each of the above-identified prior applications is incorporated herein by reference in their entireties.

TECHNICAL FIELD

The present invention relates to the technical field of multilayer films, particularly to a high-performance multilayer film for packaging. The multilayer film can be applied to vacuum packaging, gas packaging, modified atmosphere packaging, high temperature cooking packaging, aseptic packaging, and coating, printing and composite substrates, etc.

BACKGROUND OF INVENTION

Multilayer co-extruded film is the film made with several types of polymers by methods of co-extrusion blowing, casting or orientation. As plastic packaging material, this kind of film is widely used in food, processed meat, daily necessity, cosmetics, chemical, pesticide and military products etc. And it can realize the sealed flexible packaging of products and meet various packaging functions such as inflation or vacuuming, thermoforming, modified atmosphere packaging, high temperature cooking packaging, aseptic packaging, etc., as well as providing barrier function such as moisture, oxygen, oil and aroma barrier etc. in various circumstances.

In the food packaging industry, the vacuum packaging, gas packaging, modified atmosphere packaging, high temperature cooking packaging, aseptic packaging and coating, printing and composite substrates are widely used. In the vacuum packaging, the food is put into the packaging bag, the air in the package bag is removed and the bag is sealed after it reaches the predetermined vacuum degree with the main function to remove the oxygen to prevent the food from spoilage. In the gas packaging, a single gas of nitrogen, carbon dioxide or oxygen or a mixture of the two or three gases is charged after the vacuum-pumping. In the modified atmosphere packaging, the modified atmosphere fresh-keeping gas (2 or 4 kinds of gases mixed according to the characteristics of the food characteristics) is used to replace the air in the packaging bag to change the external environment of the food in the package, inhibit the growth and reproduction of bacteria, slow down the metabolic rate of fresh food, and extend the refreshing time or shelf life of the food. The aseptic packaging refers to a packaging method to seal the products that have been sterilized and have reached the commercial sterility (liquid milk and dairy products, beverages, etc.) in a sterilized container, fill in the products in a sterile environment and keep the packaging containers sealed after the filling. The composite flexible packaging film has been simultaneously developed with the vacuum packaging, gas packaging, modified atmosphere packaging and high temperature cooking packaging, aseptic packaging and coating, printing, composite substrate technology and the key to vacuum packaging, gas packaging, modified atmosphere packaging and high temperature cooking packaging, aseptic packaging and coating, printing, and composite substrate technology is to maintain the barrier function and excellent heat-sealing property of the packaging film. In order to achieve the goal of environmental protection and production reduction, the multi-layer co-extrusion process is used to achieve zero emission of VOCs and the biaxial stretching molding process is used to guarantee the strength when the firm is thin to a certain extent. However, as the processing characteristics of materials at different layers of the multi-layer high barrier film are different and the molding technology for simultaneous coextrusion and biaxial stretching under the same process conditions is limited by the prior art, the interlayer peel strength and heat-sealing property of the film cannot be guaranteed.

The prior art has the following problems: 1. The materials at different layers of the multi-layer high barrier film are different, and the stretching ratios of different materials are different, and when the material layer of the smaller stretching ratio is stretched to the same ratio as the material layer of the larger stretching ratio, the interlayer peel strength is drastically lowered or it may even be delaminated, and the material of the smaller stretching ratio is likely to be torn; 2. The heat-sealing property is lowered after the stretching; 3. In order to make the stretched film have the sufficient heat-sealing property, the stretched film is usually laminated with a heat-sealing layer, but the dry composite solvent used in the lamination contains the pollutant, which is unsafe for food and environmentally unfriendly.

DISCLOSURE OF THE INVENTION

The object of the present invention is to provide a high-performance multilayer film for packaging.

To achieve above object, the technical solution adopted in this invention is: a high-performance multilayer film for packaging, and the innovation is: the structure of the multilayer film is as follows:

BL/TIE/PO1/POX/PO3    Structure (1)

In Structure (1), explicated from left to right:
BL represents an outer layer and the material is polyamide, or polyester or ethylene-vinyl alcohol copolymer;
TIE represents a bonding layer and the material is the maleic anhydride grafted copolymer with the PO1 layer material as the carrier;
PO1 represents a main stretching layer, also known as a PO1 layer, and the material is polyethylene or polypropylene;
POX represents a stretching transition bridge, also known as a POX bridge, and the material is any one or a mixture of at least two of polyethylene, polypropylene, modified polyethylene and modified polypropylene; X represents the number of layers, and X is 1, 2, 3, . . . , but not 0;
PO3 represents an inner layer, also known as a PO3 layer, and the material is any one or a mixture of at least two of polyethylene, polypropylene, modified polyethylene and modified polypropylene;

The multilayer film in structure (1) is obtained once by multilayer coextrusion and biaxial stretching, wherein, the biaxial stretching is carried out by a two-step stretching method of longitudinal stretching first and transverse stretching later;

The total thickness of the multilayer film is 8 micrometers to 100 micrometers, the thickness of the PO1 layer is 30 to 60% of the total thickness of the multilayer film; the thickness of the POX layer is 10 to 20% of the total thickness of the multilayer film; the thickness of the PO3 layer is 8 to 20% of the total thickness of the multilayer film;

The selection requirements for the density of materials of the PO1 layer, the POX layer and the PO3 layer are as follows: When the PO1 layer is polyethylene, the density of the PO1 layer is 0.87-0.97 g/cm³; when the PO1 layer is polypropylene, the density of the PO1 layer is 0.86-0.91 g/cm³; the density of the POX bridge is 0.86-0.97 g/cm³, and the density of the PO3 layer is 0.87-0.97 g/cm³;

The absolute value of the difference of the solubility parameters between the PO1 layer and the PO3 layer material is greater than or equal to 0.1 $(J \cdot cm^{-3})^{1/2}$, and less than or equal to 6.5 $(J \cdot cm^{-3})^{1/2}$, and the absolute value of the difference of the cohesive energy density between the PO1 layer and the PO3 layer material is greater than or equal to 3 J/cm³, and less than or equal to 5 J/cm³; the solubility parameter and the cohesive energy density of the POX bridge material are based on one of the PO1 layer material and the PO3 layer material, and it's transitioned to the other in a gradient way;

The absolute value of the difference of the solubility parameters between adjacent layers from the PO1 layer to the POX bridge and to the PO3 layer is less than or equal to 0.1 $(J \cdot cm^{-3})^{1/2}$, and meanwhile, the absolute value of the difference of the cohesive energy density between adjacent layers from the PO1 layer to the POX bridge and to the PO3 layer is less than or equal to 3 J/cm³.

The above described technical solution is explained as follows:

1. In above described technical solution, the solubility parameter and the cohesive energy density of the POX bridge material are based on one of the PO1 layer material and the PO3 layer material, and it's transitioned to the other in an increment or decrement way;
2. In above described technical solution, the solubility parameter and the cohesive energy density of the POX bridge material are based on one of the PO1 layer material and the PO3 layer material, and it's transitioned to the other in a V-shaped gradient way;
3. In above described technical solution, the solubility parameter and the cohesive energy density of the POX bridge material are based on one of the PO1 layer material and the PO3 layer material, and it's transitioned to the other in an M-shaped gradient way;
4. In above described technical solution, the solubility parameter and the cohesive energy density of the POX bridge material are based on one of the PO1 layer material and the PO3 layer material, and it's transitioned to the other in a W-shaped gradient way;
5. In the present invention, the solubility parameter (referred to as SP) is a physical constant for measuring the compatibility of a polymer material under processing conditions (including liquid state of rubber and plastic under processing conditions).

The cohesive energy density is the energy E (cohesive energy) required for the vaporization of 1 mol of condensate per unit volume V to overcome the intermolecular force. It is a physical variable evaluating the magnitude of the intermolecular forces and mainly reflecting the interaction between the groups. In general, the greater the polarity of the groups contained in the molecules, the greater the force between the molecules, and the greater the corresponding cohesive energy density; and vice versa.

The physical meaning of the solubility parameter is the square root of the cohesive energy density per unit volume of the material: $SP=(E/V)^{1/2}$, wherein, SP is the solubility parameter, E is the cohesive energy, V is the volume, and Ely is the cohesive energy density.

The technical principle and advantages of the present invention: understanding the solubility parameter is to grasp the degree of compatibility between different polymers, and provide a basis for successful blending. The closer the solubility parameters of the two high polymer materials are, the better the blending effect is. If the difference between the two exceeds 0.5, it is generally difficult to blend evenly, and it is necessary to add the solubilizer. The function of the solubilizer is to reduce the surface tension of the two phases so that the surface at the interface is actuated, thereby increasing the degree of compatibility. The solubilizer is often a polymer that acts as a bridge intermediary. In the present invention, the stretching transition bridge acts as a solubilizer and a bridge intermediary.

Two important factors influencing the multilayer co-extrusion biaxial stretching of multilayer film are the solubility parameters and density of interlayer materials, and the cohesive energy density is the cohesive energy per unit volume of the material, and the cohesive energy density is proportional to the material density and the melting point/softening temperature of the material. The invention is based on the same or similar cohesive energy density and solubility parameter of the polymer as the basis for setting the stretching transition bridge (POX bridge), that is, in accordance with the basic rule of like dissolves like of organics. The closer the solubility parameters and cohesive energy density of the two high polymer materials are, the better the blending effect is. The difference between the solubility parameters and the cohesive energy density of the interlayer material is narrowed through the stretching transition bridge to eliminate or weaken the internal stress between the structural layers, improve the peel strength and heat-sealing strength, and realize the biaxial stretching of the multilayer co-extruded film.

In the present invention, when the absolute value of the difference of the solubility parameters between the PO1 layer and the PO3 layer material is greater than or equal to 0.1 $(J \cdot cm^{-3})^{1/2}$, and less than or equal to 0.5 $(J \cdot cm^{-3})^{1/2}$, and the absolute value of the difference of the cohesive energy density is greater than or equal to 3 J/cm³, and less than or equal to 5 J/cm³, the present invention can simultaneously satisfy the requirements of the transition of compatibility from the PO1 layer to the PO3 layer, the biaxial stretching of the multilayer co-extruded film and the thickness of the stretching transition bridge accounting for 10~20% of the total thickness of the multilayer film through the POX bridge. When absolute value of the difference of the solubility parameters between the PO1 layer and the PO3 layer material is greater than 0.5 $(j \cdot cm^{-3})^{1/2}$, and the absolute value of the difference of the cohesive energy density is greater than 5 J/cm³, the compatibility between the PO1 layer and the PO3 layer material is poor, and at this time, it cannot simultaneously satisfy the requirements of compatibility, biaxial stretching, and the thickness of the stretching transition bridge accounting for 10~20% of the total thickness of the multilayer film through the stretching transition bridge of the present invention. When the absolute value of the difference of the solubility parameters between the PO1 layer and the PO3 layer material is less than 0.1 $(J \cdot cm^{-3})^{1/2}$, or/and the absolute value of the difference of the cohesive energy density is less than 3 J/cm³, the stretching transition bridge is not required.

The present invention increases the strength by the biaxial stretching process to make ordered arrangement of molecules.

SPECIFIC EMBODIMENT

With reference to the embodiments, the present invention will be described in detail: Embodiment 1: In the structure of multilayer film, PO1 is polypropylene; POX is high density polyethylene/linear low density polyethylene+high density polyethylene/linear low density polyethylene+ethylene-octene copolymer; ethylene-octene copolymer, the number of layers is four; PO3 is polypropylene. See Table 1:

TABLE 1

| Layer | Polymer | Density (g/cm³) | Solubility parameter (J · cm⁻³)^(1/2) | Absolute value of the difference of the solubility parameters between adjacent layers (J · cm⁻³)^(1/2) | Cohesive energy density (J/cm³) | Absolute value of the difference of the cohesive energy density between adjacent layers (J/cm³) |
|---|---|---|---|---|---|---|
| PO1 | Polypropylene (homopolymerization) PP | 0.9000 | 8.10 | 0.10 | 65.61 | 1.61 |
| POX | High density polyethylene HDPE | 0.9600 | 8.00 | | 64.00 | |
| | Linear low density polyethylene LLDPE + high density polyethylene | 0.9250 | 7.94 | 0.06 | 63.04 | 0.96 |
| | Linear low density polyethylene LLDPE + ethylene-octene copolymer | 0.9460 | 7.98 | 0.04 | 63.68 | 0.64 |
| | Ethylene-octene copolymer | 0.9190 | 7.89 | 0.09 | 62.25 | 1.43 |
| PO3 | Polypropylene (copolymerization) PP | 0.9050 | 7.80 | 0.09 | 60.84 | 1.41 |

The density, solubility parameter and cohesive energy density of each polymer can be seen in Table 1, and the absolute value of the difference of the solubility parameters between the PO1 layer and the PO3 layer material is 0.30 (J·cm⁻³)^(1/2). 0.1 (J·cm⁻³)^(1/2)<0.30 (J·cm⁻³)^(1/2)<0.5 (J·cm⁻³)^(1/2), and the absolute value of the difference of the cohesive energy density between the PO1 layer and the PO3 layer material is 4.773 J/cm³. 3 J/cm³<4.773 J/cm³<5 J/cm³, which meets the conditions for setting the stretching transition bridge. The stretching transition bridge POX is a four-layer structure, and the solubility parameter and the cohesive energy density of the POX bridge material are based on the PO1 layer material, and it's transitioned to the PO3 layer material in a V-shaped way;

The absolute value of the difference of the solubility parameters between adjacent layers from the PO1 layer to the POX bridge and to the PO3 layer is less than or equal to 0.1 (J·cm⁻³)^(1/2), and meanwhile, the absolute value of the difference of the cohesive energy density between adjacent layers from the PO1 layer to the POX bridge and to the PO3 layer is less than or equal to 3 J/cm³.

The following embodiments are presented in a table, and no more detailed description is made by text to save space.

Embodiment 2

In the structure of multilayer film, PO1 is polypropylene; POX is high density, polyethylene/linear low density polyethylene/high density polyethylene, the number of layers is three; PO3 is ethylene-octene copolymer. See Table 2:

TABLE 2

| Layer | Polymer | Density (g/cm³) | Solubility parameter (J · cm⁻³)^(1/2) | Absolute value of the difference of the solubility parameters between adjacent layers (J · cm⁻³)^(1/2) | Cohesive energy density (J/cm³) | Absolute value of the difference of the cohesive energy density between adjacent layers (J/cm³) |
|---|---|---|---|---|---|---|
| PO1 | Polypropylene (homopolymerization) | 0.9000 | 8.10 | 0.10 | 65.61 | 1.61 |
| POX | High density polyethylene HDPE | 0.9600 | 8.00 | | 64.00 | |
| | Linear low density polyethylene LLDPE | 0.9250 | 7.95 | 0.05 | 63.20 | 0.80 |
| | High density polyethylene HDPE | 0.9200 | 7.90 | 0.05 | 62.41 | 0.79 |
| PO3 | Ethylene-octene copolymer | 0.9100 | 7.80 | 0.10 | 60.80 | 1.61 |

The solubility parameter and the cohesive energy density of the POX bridge material are based on the PO1 layer material, and it's transitioned to the PO3 layer material.

Embodiment 3

In the structure of multilayer film, PO1 is high density polyethylene; POX is linear low density polyethylene/low density polyethylene, the number of layers is two; PO3 is ethylene-octene copolymer. See Table 3:

TABLE 3

| Layer | Polymer | Density (g/cm$^3$) | Solubility parameter (J · cm$^{-3}$)$^{1/2}$ | Absolute value of the difference of the solubility parameters between adjacent layers (J · cm$^{-3}$)$^{1/2}$ | Cohesive energy density (J/cm$^3$) | Absolute value of the difference of the cohesive energy density between adjacent layers (J/cm$^3$) |
|---|---|---|---|---|---|---|
| PO1 | High density polyethylene HDPE | 0.9600 | 8.00 | 0.05 | 64.00 | 0.80 |
| POX | Linear low density polyethylene LLDPE | 0.9250 | 7.95 | 0.05 | 63.20 | 0.79 |
|  | Low density polyethylene LDPE | 0.9200 | 7.90 |  | 62.41 |  |
| PO3 | Ethylene-octene copolymer | 0.9100 | 7.80 | 0.10 | 60.80 | 1.61 |

The solubility parameter and the cohesive energy density of the POX bridge material are based on the PO1 layer material, and it's transitioned to the PO3 layer material.

Embodiment 4

In the structure of multilayer film, PO1 is high density polyethylene; POX is linear low density polyethylene/high density polyethylene+low density polyethylene, the number of layers is two; PO3 is high density polyethylene+polypropylene. See Table 4:

TABLE 4

| Layer | Polymer | Density (g/cm$^3$) | Solubility parameter (J · cm$^{-3}$)$^{1/2}$ | Absolute value of the difference of the solubility parameters between adjacent layers (J · cm$^{-3}$)$^{1/2}$ | Cohesive energy density (J/cm$^3$) | Absolute value of the difference of the cohesive energy density between adjacent layers (J/cm$^3$) |
|---|---|---|---|---|---|---|
| PO1 | High density polyethylene HDPE | 0.9600 | 8.00 | 0.05 | 64.00 | 0.80 |
| POX | Linear low density polyethylene LLDPE | 0.9250 | 7.95 | 0.05 | 63.20 | 0.79 |
|  | High density polyethylene LDPE + low density polyethylene LDPE | 0.9200 | 7.90 |  | 62.41 |  |

TABLE 4-continued

| Layer | Polymer | Density (g/cm³) | Solubility parameter (J · cm⁻³)^(1/2) | Absolute value of the difference of the solubility parameters between adjacent layers (J · cm⁻³)^(1/2) | Cohesive energy density (J/cm³) | Absolute value of the difference of the cohesive energy density between adjacent layers (J/cm³) |
|---|---|---|---|---|---|---|
| PO3 | High density polyethylene HDPE + polypropylene PP | 0.9188 | 7.85 | 0.05 | 61.62 | 0.79 |

The solubility parameter and the cohesive energy density of the POX bridge material are based on the PO1 layer material, and it's transitioned to the PO3 layer material.

Embodiment 5

In the structure of multilayer film, PO1 is polypropylene; POX is high density polyethylene/linear low density polyethylene/low density polyethylene, the number of layers is three; PO3 is ethylene-octene copolymer. See Table 5:

TABLE 5

| Layer | Polymer | Density (g/cm³) | Solubility parameter (J · cm⁻³)^(1/2) | Absolute value of the difference of the solubility parameters between adjacent layers (J · cm⁻³)^(1/2) | Cohesive energy density (J/cm³) | Absolute value of the difference of the cohesive energy density between adjacent layers (J/cm³) |
|---|---|---|---|---|---|---|
| PO1 | Polypropylene (homopolymerization) | 0.9000 | 8.10 | 0.10 | 65.01 | 1.61 |
| POX | High density polyethylene HDPE | 0.9600 | 8.00 | 0.05 | 64.00 | 0.80 |
|  | Linear low density polyethylene LLDPE | 0.9250 | 7.95 |  | 63.20 |  |
|  | Low density polyethylene LDPE | 0.9200 | 7.90 | 0.05 | 62.41 | 0.79 |
| PO3 | Ethylene-octene copolymer | 0.9100 | 7.80 | 0.10 | 60.80 | 1.61 |

The solubility parameter and the cohesive energy density of the POX bridge material are based on the PO1 layer material, and it's transitioned to the PO3 layer material.

Embodiment 6

In the structure of multilayer film, PO1 is polypropylene; POX is high density polyethylene/linear low density polyethylene+ethylene-octene copolymer, the number of layers is two; PO3 is ethylene-octene copolymer. See Table 6:

TABLE 6

| Layer | Polymer | Density ($g/cm^3$) | Solubility parameter ($J \cdot cm^{-3})^{1/2}$ | Absolute value of the difference of the solubility parameters between adjacent layers ($J \cdot cm^{-3})^{1/2}$ | Cohesive energy density ($J/cm^3$) | Absolute value of the difference of the cohesive energy density between adjacent layers ($J/cm^3$) |
|---|---|---|---|---|---|---|
| PO1 | Polypropylene (homopolymerization) PP | 0.9 | 8.1 | 0.1 | 65.61 | 1.61 |
| POX | High density polyethylene HDPE | 0.96 | 8 | 0.1 | 64 | 0.96 |
|  | Linear low density polyethylene LLDPE + ethylene-octene copolymer | 0.9198 | 7.9 |  | 63.04 |  |
| PO3 | Ethylene-octene copolymer PP | 0.91 | 7.8 | 0.1 | 60.84 | 2.2 |

The solubility parameter and the cohesive energy density of the POX bridge material are based on the PO1 layer material, and it's transitioned to the PO3 layer material.

Embodiment 7

In the structure of multilayer film, PO1 is polypropylene; POX is high density polyethylene+ethylene-octene copolymer ethylene-octene copolymer linear low density polyethylene+ethylene-octene copolymer, the number of layers is three; PO3 is polypropylene. See Table 7:

The solubility parameter and the cohesive energy density of the POX bridge material are based on the PO1 layer material, and it's transitioned to the PO3 layer material in a V-shaped way.

Embodiment 8

In the structure of multilayer film, PO1 is polypropylene; POX is modified polyethylene+high density polyethylene/linear low density polyethylene/linear low density polyethylene+modified polyethylene, the number of layers is three; PO3 is ethylene-octene copolymer. See Table 8:

TABLE 7

| Layer | Polymer | Density ($g/cm^3$) | Solubility parameter ($J \cdot cm^{-3})^{1/2}$ | Absolute value of the difference of the solubility parameters between adjacent layers ($J \cdot cm^{-3})^{1/2}$ | Cohesive energy density ($J/cm^3$) | Absolute value of the difference of the cohesive energy density between adjacent layers ($J/cm^3$) |
|---|---|---|---|---|---|---|
| PO1 | Polypropylene (homopolymerization) PP | 0.9000 | 7.8 | 0.05 | 60.84 | 0.78 |
| POX | High density polyethylene HDPE + ethylene-octene copolymer | 0.9500 | 7.85 | 0.05 | 61.62 | 0.78 |
|  | Ethylene-octene copolymer | 0.9100 | 7.8 |  | 60.84 |  |
|  | Linear low density polyethylene LLDPE + ethylene-octene copolymer | 0.9190 | 7.9 | 0.1 | 62.41 | 1.57 |
| PO3 | Polypropylene (copolymerization) PP + modified polyethylene (EVA) | 0.9088 | 7.995 | 0.095 | 63.92 | 1.51 |

TABLE 8

| Layer | Polymer | Density (g/cm³) | Solubility parameter (J · cm⁻³)^(1/2) | Absolute value of the difference of the solubility parameters between adjacent layers (J · cm⁻³)^(1/2) | Cohesive energy density (J/cm³) | Absolute value of the difference of the cohesive energy density between adjacent layers (J/cm³) |
|---|---|---|---|---|---|---|
| PO1 | Polypropylene (homopolymerization) PP | 0.9000 | 8.10 | 0.05 | 65.61 | 0.81 |
| POX | Modified polyethylene (EVA) + high density polyethylene HDPE | 0.9585 | 8.05 | 0.10 | 64.80 | 1.60 |
|  | Linear low density polyethylene LLDPE | 0.9250 | 7.95 |  | 62.20 |  |
|  | Linear low density polyethylene LLDPE + Modified polyethylene (EVA) | 0.9500 | 7.85 | 0.10 | 61.62 | 1.58 |
| PO3 | Polypropylene (copolymerization) PP + modified polyethylene (EVA) | 0.9100 | 7.80 | 0.05 | 60.84 | 0.78 |

The solubility parameter and the cohesive energy density of the POX bridge material are based on the PO1 layer material, and it's transitioned to the PO3 layer material.

It should be noted that the above described embodiments are only for illustration of technical concept and characteristics of present invention with purpose of making those skilled in the art understand the present invention. The technicians in this art could make change on the basis of the above embodiment, such as choosing different densities of materials, choosing different activators, etc, and thus these embodiments shall not limit the protection range of present invention. The equivalent changes or modifications according to spiritual essence of present invention shall fall in the protection scope of present invention.

What is claimed is:

1. A high-performance multilayer film for packaging, wherein the high-performance multilayer has a structure according to Structure (1):

BL/TIE/PO1/POX/PO3           Structure (1)

wherein in Structure (1)
BL represents an outer layer and is comprised of a polyamide, a polyester or an ethylene-vinyl alcohol copolymer material;
TIE represents a bonding layer and is comprised of a maleic anhydride grafted copolymer material;
PO1 represents a main stretching layer and is comprised of polyethylene or polypropylene material;
POX represents a stretching transition bridge and is comprised of any one or a mixture of at least two of polyethylene, polypropylene, modified polyethylene and modified polypropylene material, wherein the POX bridge is comprised of one or more layers; and
PO3 represents an inner layer and is comprised of any one or a mixture of at least two of polyethylene, polypropylene, modified polyethylene and modified polypropylene material;
wherein the multilayer film is obtained by multilayer coextrusion and biaxial stretching, wherein the biaxial stretching is carried out by a two-step stretching method of longitudinal stretching first and transverse stretching later, thereby obtaining the multilayer film in coextruded and biaxially stretched form;
wherein a total thickness of the multilayer film is from 8 micrometers to 100 micrometers, a thickness of the PO1 layer comprises from 30 to 60% of the total thickness of the multilayer film; a thickness of the POX bridge comprises from 10 to 20% of the total thickness of the multilayer film; and a thickness of the PO3 layer comprises from 8 to 20% of the total thickness of the multilayer film;
wherein when the PO1 layer material is polyethylene, a density of the PO1 layer is from about 0.87 to about 0.97 g/cm³, or when the PO1 layer material is polypropylene, the density of the PO1 layer is from about 0.86 to about 0.91 g/cm³, a density of the POX bridge is from about 0.86 to about 0.97 g/cm³, and a density of the PO3 layer is from about 0.87 to about 0.97 g/cm³;
wherein an absolute value of a difference of solubility parameters between the PO1 layer material and the PO3 layer material is greater than or equal to 0.1 (J·cm⁻³)^(1/2) and less than or equal to 0.5 (j·cm⁻³)^(1/2), and an absolute value of a difference of cohesive energy density between the PO1 layer material and the PO3 layer material is greater than or equal to 3 J/cm³ and less than or equal to 5 J/cm³; a solubility parameter and a cohesive energy density of the POX bridge material are based on the solubility parameter and the cohesive energy density, respectively, of one of the PO1 layer material and the PO3 layer material, and the solubility parameter and the cohesive energy density of the POX bridge material are values that form a gradient to transition from the solubility parameter and the cohesive energy density, respectively, of the one of the PO1 layer material and the PO3 layer material toward the solubility parameter and the cohesive energy density, respectively, of the other one of the PO1 layer material and the PO3 layer material; and
wherein an absolute value of the difference of the solubility parameters between the PO1 layer material and the POX bridge material and between the PO3 layer material and the POX bridge material, is less than or equal to 0.1 $(\text{J} \cdot \text{cm}^{-3})^{1/2}$, and an absolute value of the difference of the cohesive energy density between the PO1 layer material and the POX bridge material and between the PO3 layer material and the POX bridge material is less than or equal to 3 $\text{J/cm}^3$.

2. The high-performance multilayer film for packaging of claim 1, wherein the gradient of the solubility parameter and the cohesive energy density of the POX bridge material is either incremental or decremental.

3. The high-performance multilayer film for packaging of claim 1, wherein the gradient of the solubility parameter and the cohesive energy density of the POX bridge material is a V-shaped gradient.

4. The high-performance multilayer film for packaging of claim 1, wherein the gradient of the solubility parameter and the cohesive energy density of the POX bridge material is a M-shaped gradient.

5. The high-performance multilayer film for packaging of claim 1, wherein the gradient of the solubility parameter and the cohesive energy density of the POX bridge material is a W-shaped gradient.

* * * * *